(12) United States Patent
Takeshita et al.

(10) Patent No.: US 7,355,952 B2
(45) Date of Patent: Apr. 8, 2008

(54) LIQUID CRYSTAL DEVICE, ITS DRIVING METHOD, AND DRIVING APPARATUS

(75) Inventors: Yasuyuki Takeshita, Tokyo (JP); Atsushi Fukumoto, Kanagawa (JP); Shinichi Kai, Tokyo (JP)

(73) Assignee: Sony Corporation, Tokyo (JP)

( * ) Notice: Subject to any disclaimer, the term of this patent is extended or adjusted under 35 U.S.C. 154(b) by 540 days.

(21) Appl. No.: 10/505,167

(22) PCT Filed: Mar. 5, 2003

(86) PCT No.: PCT/JP03/02567
§ 371 (c)(1),
(2), (4) Date: Apr. 21, 2005

(87) PCT Pub. No.: WO03/075082
PCT Pub. Date: Sep. 12, 2003

(65) Prior Publication Data
US 2005/0174339 A1      Aug. 11, 2005

(30) Foreign Application Priority Data
Mar. 6, 2002    (JP)    ............... 2002-060437

(51) Int. Cl.
*G11B 7/00* (2006.01)
(52) U.S. Cl. ............................... 369/112.02
(58) Field of Classification Search ............ None
See application file for complete search history.

(56) References Cited
U.S. PATENT DOCUMENTS 5,901,131 A * 5/1999 Ootaki et al. .......... 369/112.02
5,914,923 A * 6/1999 Araki et al. ............ 369/44.32
6,125,088 A * 9/2000 Ogasawara ............. 369/44.32
6,411,576 B1 * 6/2002 Furukawa et al. ...... 369/53.19
7,142,497 B2 * 11/2006 Hirai ..................... 369/112.17

FOREIGN PATENT DOCUMENTS

JP    2001-167470    6/2001

* cited by examiner

Primary Examiner—William Korzuch
Assistant Examiner—Peter Vincent Agustin
(74) Attorney, Agent, or Firm—Oblon, Spivak, McClelland, Maier & Neustadt, P.C.

(57) ABSTRACT

A liquid crystal device, and a method and an apparatus for driving the same in which the refractive index of the liquid crystal device is adjusted using a simple driving method and apparatus, which is advantageous in that the cost is reduced, are provided. A liquid crystal device (10) includes a first transparent substrate (1002) and a second transparent substrate (1004) that face each other, a liquid crystal (1014) filled between the first and second transparent substrates (1002, 1004), a first transparent electrode (1006) formed on a surface of the first transparent substrate (1002) that faces the second transparent substrate (1004), and a second transparent electrode (1008) formed on a surface of the second transparent substrate (1004) that faces the first transparent substrate (1002). First and second driving signals (S1, S2) of square waves are applied to the first and second transparent electrodes (1002, 1004) with a time interval t (sec) therebetween. Thus, the potential difference between the first and second driving signals (S1, S2) is applied to the liquid crystal (1014).

15 Claims, 12 Drawing Sheets

(A)

(B)

FIG. 5A
FIG. 5B
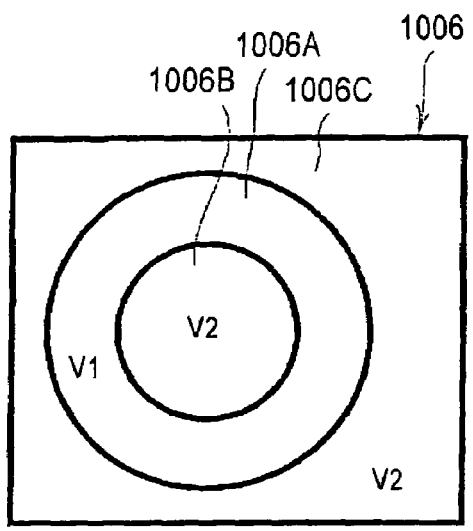
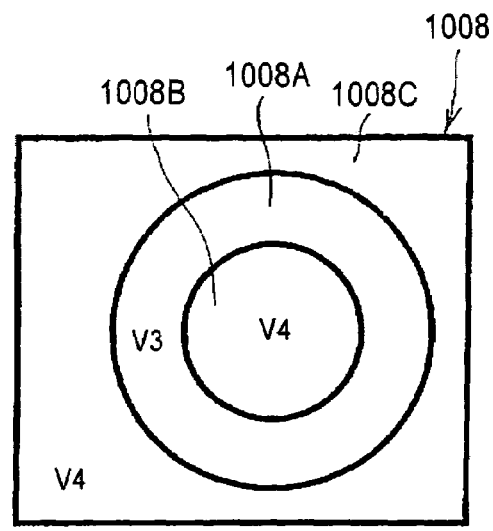
FIG. 5C
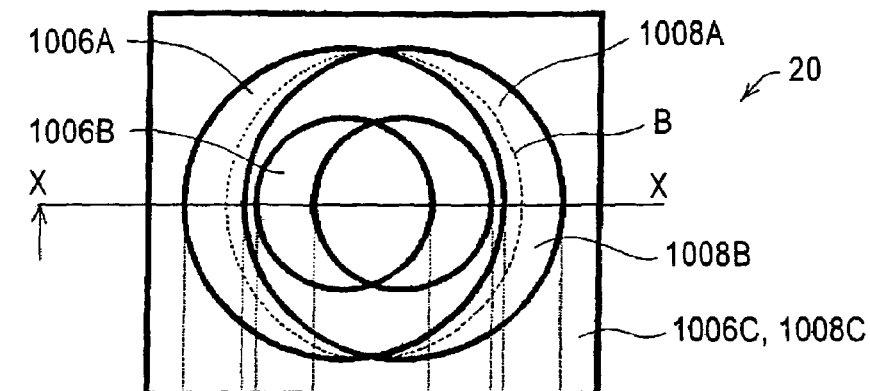
FIG. 5D
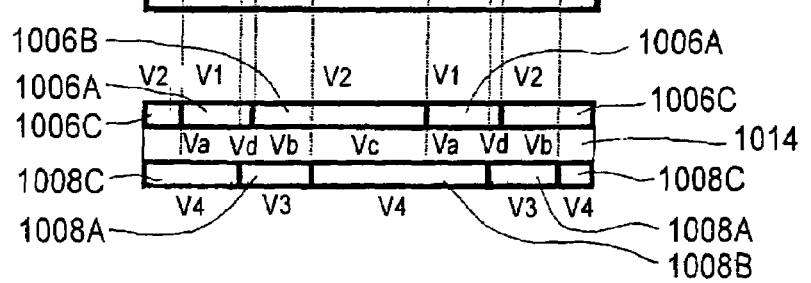

FIG. 9A
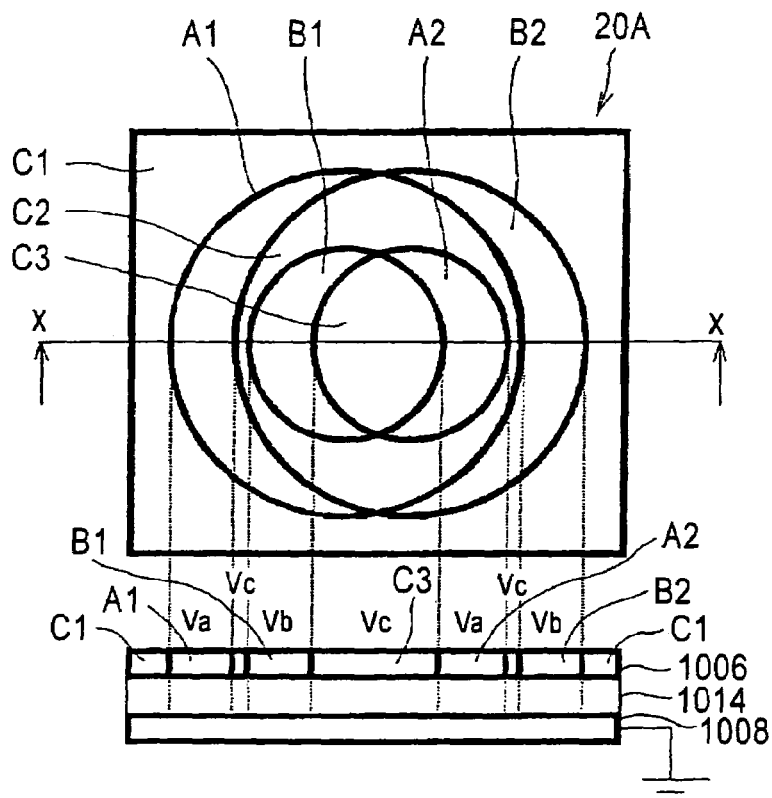
FIG. 9B
FIG. 10
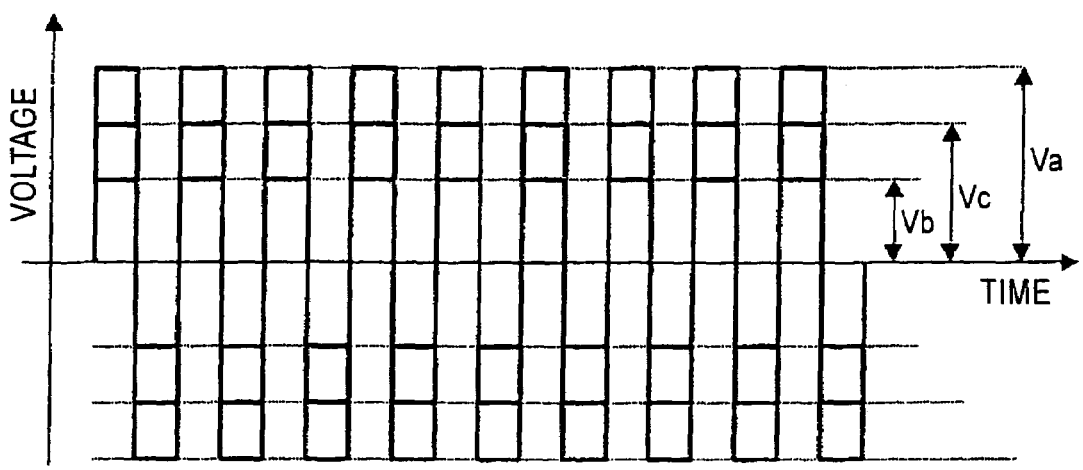

LIQUID CRYSTAL DEVICE, ITS DRIVING METHOD, AND DRIVING APPARATUS

TECHNICAL FIELD

The present invention relates to a liquid crystal device, and a method and an apparatus for driving the same.

BACKGROUND ART

Typically, in playing back a signal recorded on an optical disk having a land/groove format using an optical head, the playback laser beam from the optical head experiences an optical phase difference between playback in a land and playback in a groove. Thus, the optical head requires optical compensation equipment for removing the optical phase difference in order to increase the quality of both playback signals for the land and the groove.

If the optical disk is inclined, or tilted (skewed), with respect to the light beam emitted from the optical head onto the optical disk, a spatial phase shift occurs in the playback laser beam spot, thus causing degradation in quality of the playback signals while increasing the occurrence of read errors. Thus, a compensator for compensating for such a phase shift, or an optical phase difference, must be provided in the optical head.

One compensator for compensating for such a phase difference that has attracted attention is a liquid crystal device.

A method for driving such a liquid crystal device in the related art is as follows:

A reference voltage (for example, a ground potential) is applied to one of two transparent electrodes that sandwich a liquid crystal therebetween, and a square wave with a duty ratio of 50%, of which the center of the amplitude is equal to the reference voltage, is applied to the other transparent electrode.

When the amplitude of the square wave is varied, the refractive index of the liquid crystal changes by $\Delta NLC$. In this state, when laser light passes through the liquid crystal device, an optical phase difference of $\Delta NLC \cdot d$ occurs, which is a product of the refractive-index change $\Delta NLC$ and the thickness d of the liquid crystal.

Generally, liquid crystals are damaged when a DC voltage (direct-current voltage) is applied. Thus, as described above, if one of the two transparent electrodes is fixed to a reference potential, a square-wave voltage (pulse voltage) with a 50% duty ratio, of which the amplitude center potential is equal to the reference potential, must be applied to the other transparent electrode.

In such a driving method of the related art, when only a single-polarity power supply (e.g., a positive power supply) is used, a reference potential circuit for generating the center potential of the square-wave amplitude is required.

If the reference potential is ground, two power supplies, that is, a positive power supply and a negative power supply, are required. A driving signal for driving the liquid crystal is a square wave, which is typically generated by a digital circuit, and the digital signal generated by the digital circuit is often single-polarity. A level-shifting circuit is thus required for generating a square wave whose reference potential is ground.

Therefore, there is a problem with the related art in that a complex method and apparatus for driving a liquid crystal device must be used to adjust the refractive index of the liquid crystal device, thus increasing the cost.

The present invention has been made in view of such a background, and it is an object of the present invention to provide a liquid crystal device, and a method and an apparatus for driving the same in which the refractive index of the liquid crystal device is adjusted using a simple driving method and apparatus, which is advantageous in that the cost is reduced.

DISCLOSURE OF THE INVENTION

The present invention provides a method for driving a liquid crystal device including a first transparent substrate and a second transparent substrate that face each other, a liquid crystal filled between the first and second transparent substrates, a first transparent electrode formed on a surface of the first transparent substrate that faces the second transparent substrate, and a second transparent electrode formed on a surface of the second transparent substrate that faces the first transparent substrate. The method includes the steps of applying a first driving signal of a square-wave voltage to the first transparent electrode and applying a second driving signal of a square-wave voltage to the second transparent electrode; and where the first driving signal has a voltage amplitude V1, a frequency F1, and a duty ratio D1, the second driving signal has a voltage amplitude V2, a frequency F2, and a duty ratio D2, and a phase difference between the first driving signal and the second driving signal is indicated by $\phi$, controlling a refractive index $\Delta N$ of the liquid crystal by adjusting the phase difference $\phi$ in a state where V1=V2, F1=F2, and D1=D2 so as to vary an effective voltage to be applied to the liquid crystal.

The present invention further provides an apparatus for driving a liquid crystal device including a first transparent substrate and a second transparent substrate that face each other, a liquid crystal filled between the first and second transparent substrate, a first transparent electrode formed on a surface of the first transparent substrate that faces the second transparent substrate, and a second transparent electrode formed on a surface of the second transparent substrate that faces the first transparent substrate. The apparatus includes voltage application means for applying a first driving signal of a square-wave voltage to the first transparent electrode and applying a second driving signal of a square-wave voltage to the second transparent electrode; and control means for, where the first driving signal has a voltage amplitude V1, a frequency F1, and a duty ratio D1, the second driving signal has a voltage amplitude V2, a frequency F2, and a duty ratio D2, and a phase difference between the first driving signal and the second driving signal is indicated by $\phi$, controlling a refractive index $\Delta N$ of the liquid crystal by adjusting the phase difference $\phi$ in a state where V1=V2, F1=F2, and D1=D2 so as to vary an effective voltage to be applied to the liquid crystal.

According to the present invention, a phase difference between the first and second driving signals is adjusted, thereby controlling an effective voltage to be applied to the liquid crystal to control the refractive index of the liquid crystal.

The present invention further provides a liquid crystal device including a first transparent substrate and a second transparent substrate that face each other, a liquid crystal filled between the first and second transparent substrates, a first transparent electrode formed on a surface of the first transparent substrate that faces the second transparent substrate, and a second transparent electrode formed on a surface of the second transparent substrate that faces the first transparent substrate, the first and second transparent electrodes forming planes that extend in parallel to each other with a spacing therebetween. In the liquid crystal device, the first transparent electrode includes a first annular electrode portion, a second round electrode portion formed in the first electrode portion, and a third electrode portion formed around the first electrode portion, and the second transparent electrode includes a fourth annular electrode portion, a fifth round electrode portion formed in the fourth electrode portion, and a sixth electrode portion formed around the fourth electrode portion. The first and fourth electrode portions have the same annular shape, and the second and fifth electrode portions have the same round shape. The first and second transparent electrodes are disposed so that there is a spacing between a first axis that extends through the center of the first electrode portion and that is orthogonal to the first transparent electrode and a second axis that extends through the center of the fourth electrode portion and that is orthogonal to the second transparent electrode.

The present invention further provides a method for driving a liquid crystal device including a first transparent substrate and a second transparent substrate that face each other, a liquid crystal filled between the first and second transparent substrates, a first transparent electrode formed on a surface of the first transparent substrate that faces the second transparent substrate, and a second transparent electrode formed on a surface of the second transparent substrate that faces the first transparent substrate, the first and second transparent electrodes forming planes that extend in parallel to each other with a spacing therebetween, wherein the first transparent electrode has a first annular electrode portion, a second round electrode portion formed in the first electrode portion, and a third electrode portion formed around the first electrode portion, and the second transparent electrode has a fourth annular electrode portion, a fifth round electrode portion formed in the fourth electrode portion, and a sixth electrode portion formed around the fourth electrode portion, the first and fourth electrode portions having the same annular shape and the second and fifth electrode portions having the same round shape. The method includes the steps of applying a first driving signal of a square-wave voltage to the first electrode portion; applying a second driving signal of a square-wave voltage to the second and third electrode portions; applying a third driving signal of a square-wave voltage to the fourth electrode portion; applying a fourth driving signal of a square-wave voltage to the fifth and sixth electrode portions; and where a phase difference between the first driving signal and third driving signal is indicated by $\phi1$, a phase difference between the first driving signal and the second driving signal is indicated by $\phi2$, and a phase difference between the third driving signal and the fourth driving signal is indicated by $\phi3$, controlling a refractive index of the liquid crystal between the first transparent electrode and the second transparent electrode by fixing the phase difference $\phi1$ and adjusting the phase difference $\phi2$ and the phase difference $\phi3$ by an identical phase amount in a state where the first to fourth driving signals have the same voltage amplitude, frequency, and duty ratio, so as to vary an effective voltage to be applied to the liquid crystal.

The present invention further provides an apparatus for driving a liquid crystal device including a first transparent substrate and a second transparent substrate that face each other, a liquid crystal filled between the first and second transparent substrates, a first transparent electrode formed on a surface of the first transparent substrate that faces the second transparent substrate, and a second transparent electrode formed on a surface of the second transparent substrate that faces the first transparent substrate, the first and second transparent electrode forming planes that extend in parallel to each other with a spacing therebetween, wherein the first transparent electrode has a first annular electrode portion, a second round electrode portion formed in the first electrode portion, and a third electrode portion formed around the first electrode portion, and the second transparent electrode has a fourth annular electrode portion, a fifth round electrode portion formed in the fourth electrode portion, and a sixth electrode portion formed around the fourth electrode portion, the first and fourth electrode portions having the same annular shape and the second and fifth electrode portions having the same round shape. The apparatus includes voltage application means for applying a first driving signal of a square-wave voltage to the first electrode portion, applying a second driving signal of a square-wave voltage to the second and third electrode portions, applying a third driving signal of a square-wave voltage to the fourth electrode portion, and applying a fourth driving signal of a square-wave voltage to the fifth and sixth electrode portions; and control means for, where a phase difference between the first driving signal and the third driving signal is indicated by $\phi1$, a phase difference between the first driving signal and the second driving signal is indicated by $\phi2$, and a phase difference between the third driving signal and the fourth driving signal is indicated by $\phi3$, controlling a refractive index of the liquid crystal disposed between the first transparent electrode and the second transparent electrode by fixing the phase difference $\phi1$ and adjusting the phase difference $\phi2$ and the phase difference $\phi3$ by an identical phase amount in a state where the first to fourth driving signals have the same voltage amplitude, frequency, and duty ratio, so as to vary an effective voltage to be applied to the liquid crystal.

According to the present invention, the first to fourth driving signals are applied to the first to sixth electrode portions of the liquid crystal, thus allowing a voltage to be individually applied to liquid crystal portions between the first to sixth electrode portions. Therefore, the phase differences between the driving signals are adjusted, thereby controlling an effective voltage to be applied to the liquid crystal to independently control the refractive index of the liquid crystal portions.

BRIEF DESCRIPTION OF THE DRAWINGS

FIG. 5A is a plan view of a first transparent electrode of a liquid crystal device according to a second embodiment, FIG. 5B is a plan view of a second transparent electrode, FIG. 5C is a diagram showing the state where a liquid crystal is filled in between the first and second transparent electrodes, and FIG. 5D is a cross-sectional view, taken along a line X-X of FIG. 5C.

FIG. 9A is a plan view showing the structure of the liquid crystal device of the related art, and FIG. 9B is a cross-sectional view, taken along a line X-X of FIG. 9A.

FIG. 10 is a waveform diagram of a driving signal that is applied to the liquid crystal device shown in FIG. 9A.

BEST MODE FOR CARRYING OUT THE INVENTION

A method and an apparatus for driving a liquid crystal device, and the liquid crystal device according to embodiments of the present invention will be described in detail hereinbelow with reference to the accompanying drawings.

Figure 2:
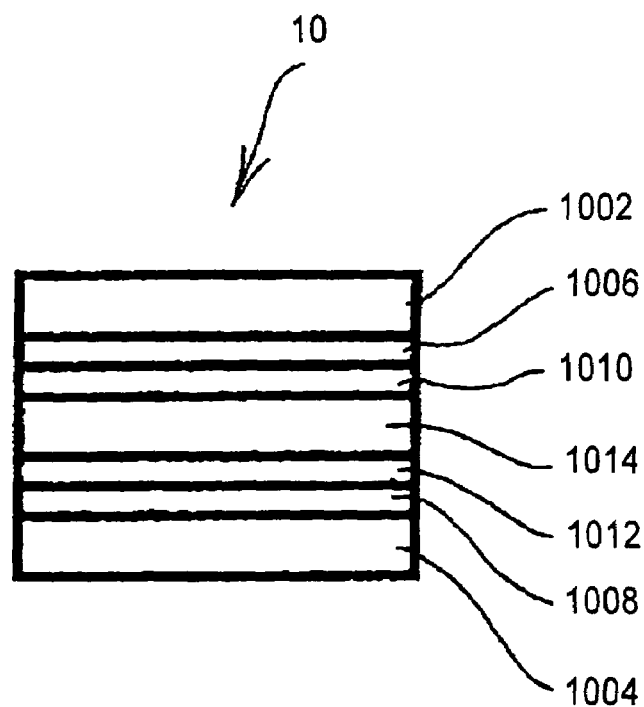
FIG. 2 is a diagram showing the structure of a liquid crystal device according to a first embodiment of the present invention.

FIG. 2 is a diagram showing the structure of a liquid crystal device according to a first embodiment of the present invention.

A liquid crystal device 10 includes a first transparent substrate 1002 and a second transparent substrate 1004 that face each other, a liquid crystal 1014 filled between the first and second transparent substrates 1002 and 1004, a first transparent electrode 1006 formed on a surface of the first transparent substrate 1002 that faces the second transparent substrate 1004, a second transparent electrode 1008 formed on a surface of the second transparent substrate 1004 that faces the first transparent substrate 1002, an alignment film 1010 formed on a surface of the first transparent electrode 1006 that faces the second transparent electrode 1008, and an alignment film 1012 formed on a surface of the second transparent electrode 1008 that faces the first transparent electrode 1006.

The first and second transparent substrates 1002 and 1004 are placed in parallel to each other with a spacing therebetween. The first and second transparent electrodes 1006 and 1008 are formed by, for example, evaporating ITO onto the first and second transparent substrates 1002 and 1004. The alignment films 1010 and 1012 have a function of specifying the alignment direction of liquid crystal molecules of the liquid crystal 1014.

The operation principle of the liquid crystal device 10 will now be described.

When a voltage is applied to the first and second transparent electrodes 1006 and 1008, liquid crystal molecules, which are non-uniformly aligned before application of the voltage, are aligned along the alignment films 1010 and 1012. The molecular alignment of the liquid crystal molecules depends upon the applied voltage, i.e., an effective voltage described below.

Figure 3:
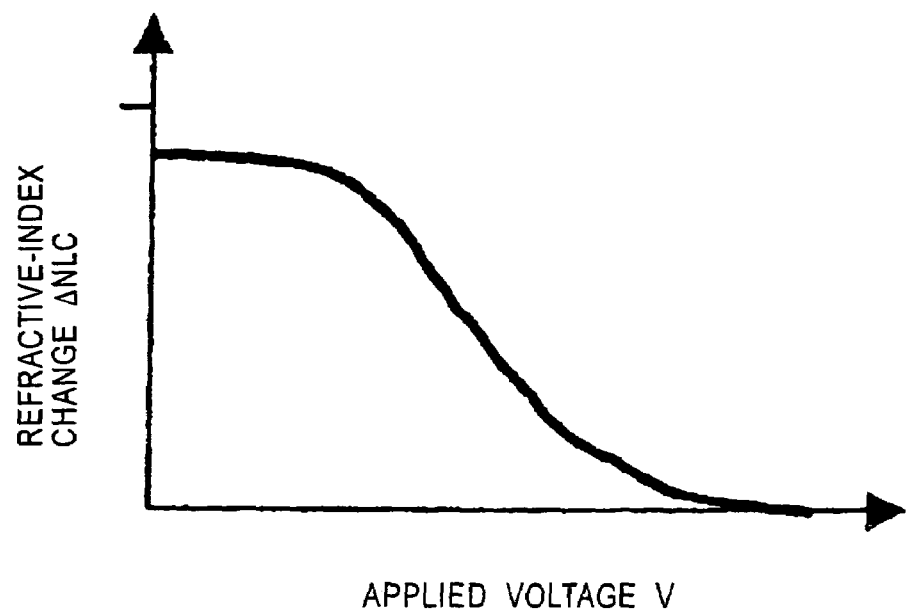
FIG. 3 is a characteristic chart showing a refractive-index change $\Delta$NLC with respect to an applied voltage V in the first embodiment.

FIG. 3 is a characteristic chart showing a refractive-index change ΔNLC with respect to an applied voltage V.

As shown in FIG. 3, the refractive index changes depending upon the magnitude of the applied voltage V.

When laser light having a polarized component parallel to the alignment direction of the liquid crystal molecules passes through the liquid crystal 1014 of the liquid crystal device 10, the transmitted light, which is the laser light that has passed through the liquid crystal 1014, experiences an optical phase difference of ΔNLC·d, which is a product of the refractive-index change ΔNLC and the thickness d of the liquid crystal 1014. In this manner, the applied voltage V is varied in magnitude, thus allowing for phase control of the transmitted light.

An apparatus and a method for driving the liquid crystal device will now be described.

Figure 1:
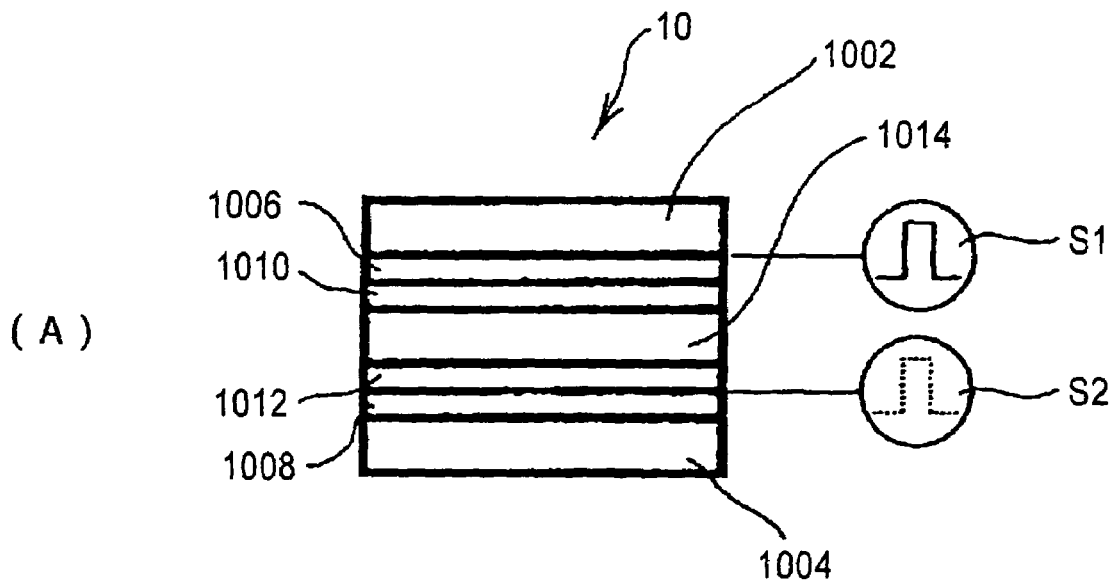
FIG. 1(A) is a diagram for showing a method for driving a liquid crystal device.
FIG. 1(B) is a waveform diagram of driving signals for driving the liquid crystal device.
Figure 1:
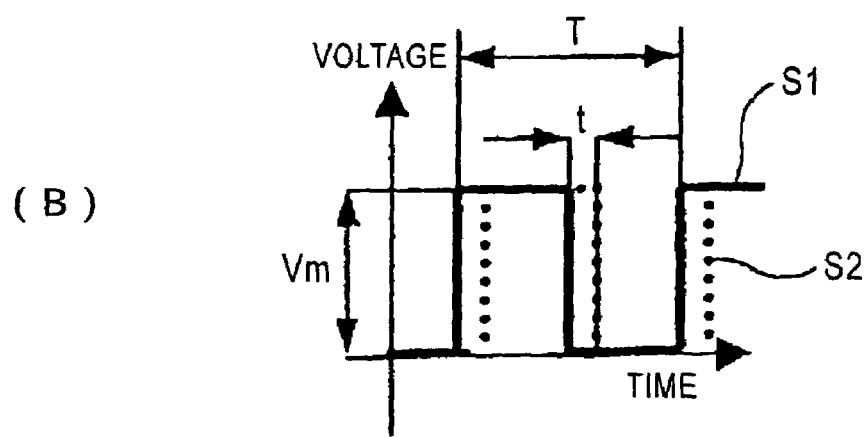
Figure 11:
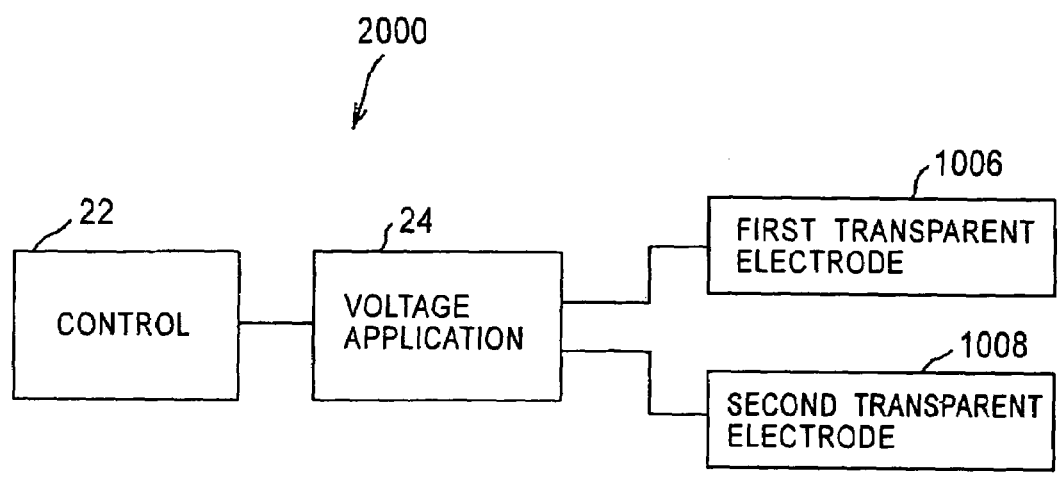
FIG. 11 is a block diagram showing the structure of an apparatus for driving a liquid crystal device.

FIG. 11 is a block diagram showing the structure of a driving apparatus for the liquid crystal device. FIG. 1(A) is a diagram for showing a method for driving the liquid crystal device, and FIG. 1(B) is a waveform diagram of driving signals for driving the liquid crystal device.

As shown in FIG. 11, a driving apparatus 2000 includes a voltage application unit 24 that applies a driving signal to each of the first and second transparent electrodes 1006 and 1008 of the liquid crystal device 10, and a control unit 22 that controls the voltage application unit 24 to control a phase difference between the driving signals.

As shown in FIG. 1(A), square-wave driving signals to be applied to the first and second transparent electrodes 1006 and 1008 by the voltage application unit 24 are represented by first and second driving signals S1 and S2, respectively.

It is assumed herein that the first and second driving signals S1 and S2 have voltage amplitudes V1 and V2, frequencies F1 and F2, and duty ratios D1 and D2, respectively.

In this example, the first and second driving signals S1 and S2 have the same voltage amplitude (V1=V2=Vm), the same frequency (F1=F2=Fm), and the same duty ratio (D1=D2=Dm).

The first and second driving signals S1 and S2 are applied with a time interval t (sec) therebetween to the first and second transparent electrodes 1006 and 1008, respectively. Thus, the potential difference between the first and second driving signals S1 and S2 is applied to the liquid crystal 1014.

As shown in FIG. 1(B), where each of the first and second driving signals S1 and S2 has a period T (sec), and the effective voltage to be applied to the liquid crystal 1014 is indicated by Veff, the effective voltage is given by Equation (1):

$$Veff = Vm(2t/T)^{1/2} \quad (1)$$

As is apparent from Equation (1), the time interval t, in other words, the phase difference, between the first and second driving signals S1 and S2 is adjusted by the control unit 22, thereby controlling the effective voltage Veff and the refractive index ΔNLC of the liquid crystal.

As described above, according to the first embodiment, the liquid crystal device 10 is disposed between a light source of an optical head and a recording surface of an optical disk, and is driven by the driving method described above, thus removing an optical phase difference between the reflected laser beams of a land and a groove during playback of the signals recorded in the optical disk that has a land/groove format.

If the square-wave voltages of the first and second driving signals S1 and S2 applied to the first and second transparent electrodes 1006 and 1008 have the same low-level voltage, high-level voltage, and duty ratio, the DC field applied to the liquid crystal 1014 is zero. Thus, unlike the method of the related art, there is no limitation on the so-called DC level such that the reference potential must be the center of the amplitude, which is advantageous since a simple circuit is used for driving the liquid crystal device 10.

A mechanism in which there is a phase difference between the first and second driving signals S1 and S2 is implemented by forming a counter in a logic LSI and delaying the voltage phase of a square-wave voltage until reaching a certain count. Alternatively, this mechanism may be implemented by delaying a square-wave voltage using a delay line.

According to the first embodiment, therefore, the liquid crystal device is directly driven by a standard logic device. This is advantageous in that the driving circuit for the liquid crystal device 10 has a simple structure.

The liquid-crystal driving current is about 1 μA/cm². Therefore, an electrode of several square centimeters can be sufficiently driven by a standard logic device.

A description will now be made of the advantages of the method for driving the liquid crystal device of the first embodiment over the method for driving the liquid crystal device of the related art.

Figure 7A:
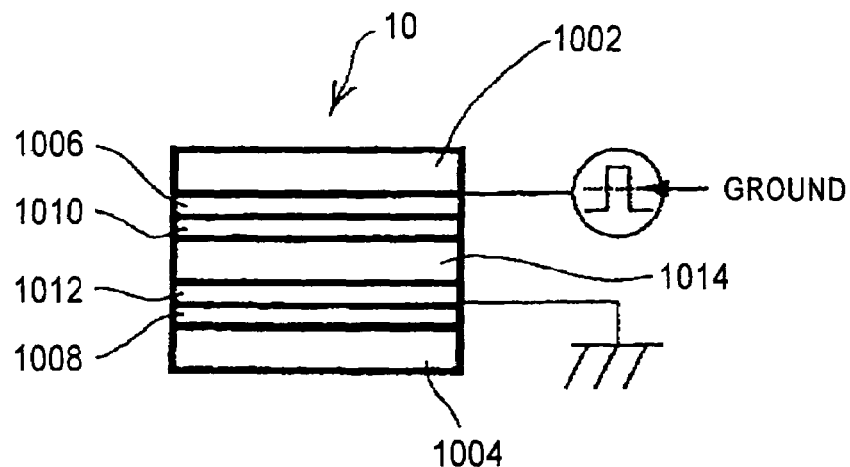
FIG. 7A is a diagram for showing a method for driving a liquid crystal device of the related art.
Figure 7B:
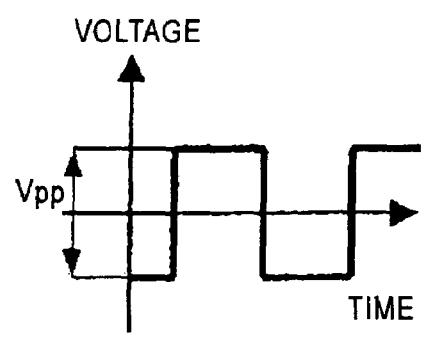
FIG. 7B is a waveform diagram of a driving signal.

In the method for driving the liquid crystal device of the related art, as shown in FIG. 7A, the second transparent electrode is fixed to a reference ground level, and, as shown in FIG. 7B, a square-wave driving signal with a 50% duty ratio and a voltage having an amplitude Vpp that is centered around the ground level is applied to the first transparent electrode.

In this case, the refractive index of the liquid crystal 1014 changes depending upon the effective value of the potential difference between the first and second transparent electrodes 1006 and 1008. This effective value, Veff, is given by Vpp/2, and the amplitude Vpp of the square wave is varied so as to vary the refractive-index change ΔNLC of the liquid crystal 1014, thereby compensating for the optical phase difference.

As described above, such a driving method for the liquid crystal device of the related art requires a complex circuit structure for generating a square wave whose reference potential is the ground level, thus increasing the cost. In contrast with such a drawback, the present embodiment is advantageous in that a driving circuit for driving the liquid crystal device 10 can be simple, thus reducing the cost.

Figure 8:
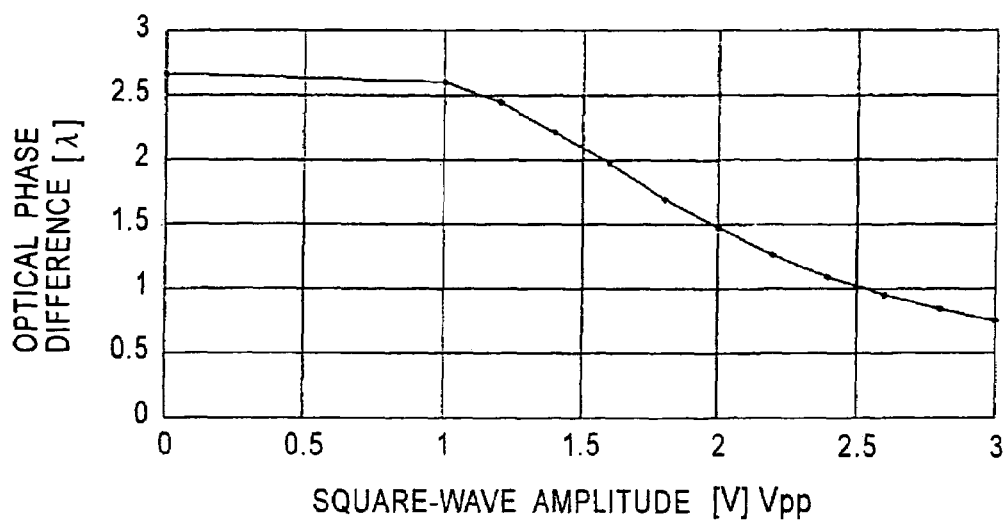
FIG. 8 is a characteristic chart of a measured optical phase difference λ generated in the liquid crystal with respect to a square-wave amplitude Vpp in the liquid crystal device driving method of the related art.

FIG. 8 is a characteristic chart showing a measurement of optical phase difference λ caused in the liquid crystal with respect to the square-wave amplitude Vpp in the method for driving the liquid crystal device of the related art.

In the related art, as shown in FIG. 8, the change of the optical phase difference λ, i.e., a phase-difference change ΔLCN, is nonlinear with respect to the square-wave amplitude Vpp, and also exhibits a sharp gradient.

Thus, in order to finely adjust the optical phase difference λ, it is necessary to finely vary the square-wave amplitude Vpp.

Since the relationship between the square-wave amplitude Vpp and the optical phase difference λ is nonlinear, when a driving circuit for generating a driving signal includes a closed loop, a circuit design taking gain variations into consideration is necessary.

Figure 4:
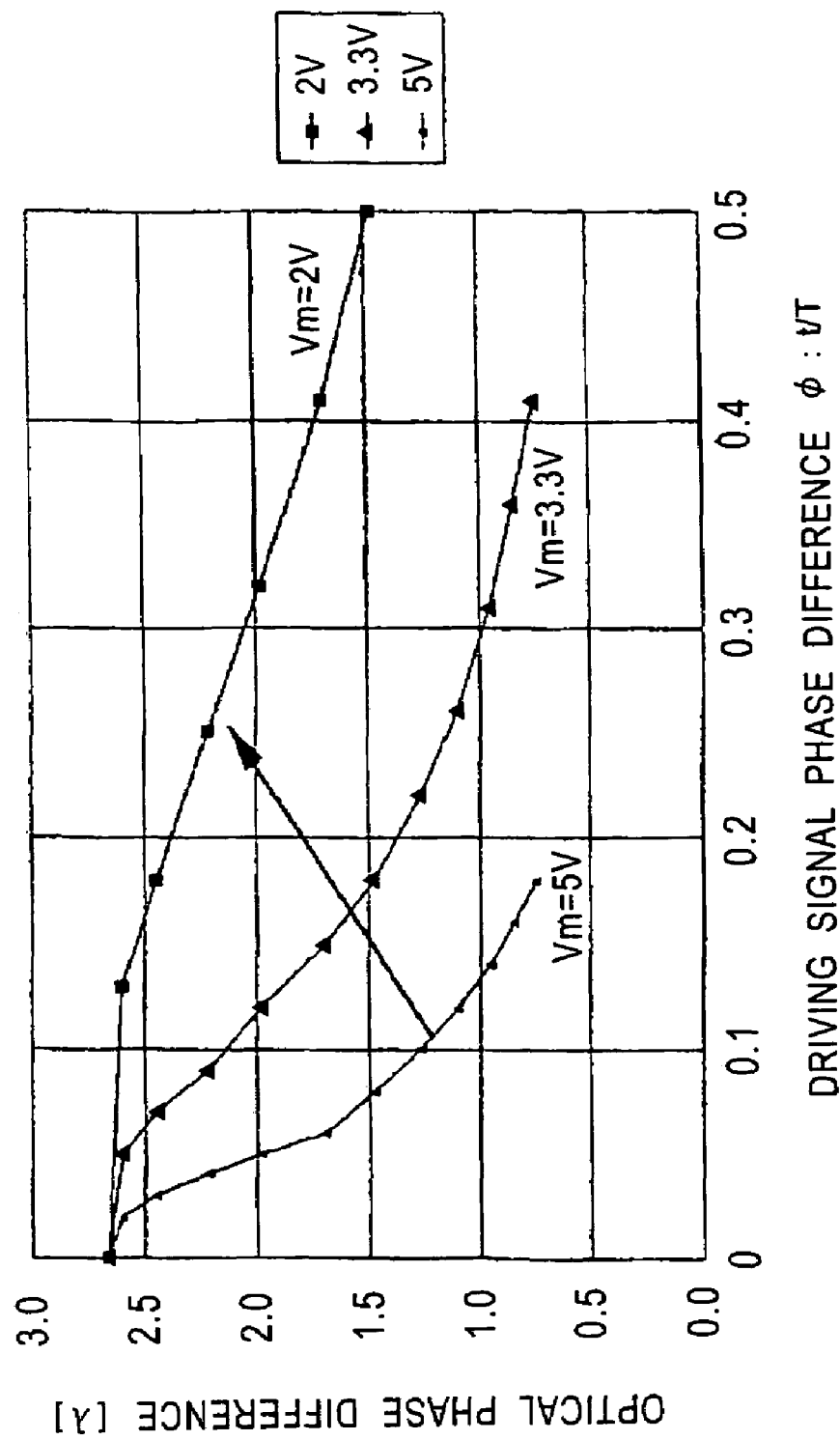
FIG. 4 is a characteristic chart of a measured optical phase difference $\lambda$ with respect to a phase difference $\phi$ between first and second driving signals S1 and S2 in the first embodiment in the first embodiment.

FIG. 4 is a characteristic chart of a measured optical phase difference λ with respect to the phase difference φ, in terms of voltages Vm of the first and second driving signals S1 and S2 as parameters (Vm=2V, 3.3V, 5V), in the first embodiment.

The phase difference φ is given by dividing the time interval t between the first and second driving signals S1 and S2 by the period T of the first and second driving signals S1 and S2 (t/T). The change of the optical phase difference λ corresponds to the value ΔNLC described above.

In the first embodiment, as is apparent from FIG. 4, as the voltage amplitude Vm decreases, i.e., 5 V to 3.3 V to 2 V, the gradient of the optical phase difference λ with respect to the change of the phase difference φ becomes moderate and approaches a straight line.

Thus, by appropriately setting the amplitude Vm of the first and second driving signals in FIG. 4 (to, for example, 2 V), the gradient of the optical phase difference λ with respect to the change of the phase difference φ becomes moderate and linear. Therefore, the first embodiment is advantageous in that the SN ratio of the driving circuit increases and the driving circuit is a simple linear circuit.

A second embodiment will now be described.

The second embodiment will be described in the context of a liquid crystal device for compensating for a phase shift caused when an optical disk is tilted, and a method and an apparatus for driving the liquid crystal device.

First, the necessity for compensation of a phase shift caused due to tilting of an optical disk will be described.

When a recording surface of an optical disk is tilted with respect to a light beam emitted from an optical head onto the recording surface, that is, when there is an angle between the light beam and the axis orthogonal to the recording surface, the capability of focusing a beam spot onto the disk recording surface through a transparent disk substrate of the optical disk is degraded.

This is because the light beam passing through the tilted transparent disk substrate experiences an aberration in the spatial phase distribution of the light beam, i.e., a wavefront aberration.

Thus, in order to compensate for the phase aberration caused by tilting of the optical disk, that is, in order to prevent degradation of the capability of focusing a beam spot onto the disk recording surface, an opposite-phase distribution for canceling the phase aberration caused by the tilting is applied in advance to the light beam entering the transparent disk substrate.

The liquid crystal device, and the method and apparatus for driving the liquid crystal device according to the second embodiment will now be described.

The basic structure of the liquid crystal device of the second embodiment is similar to that of the first embodiment shown in FIG. 2.

Specifically, also referring to FIG. 2, the liquid crystal device of the second embodiment includes a first transparent substrate 1002 and a second transparent substrate 1004 that face each other, a liquid crystal 1014 filled between the first and second transparent substrates 1002 and 1004, a first transparent electrode 1006 formed on a surface of the first transparent substrate 1002 that faces the second transparent substrate 1004, a second transparent electrode 1008 formed on a surface of the second transparent substrate 1004 that faces the first transparent substrate 1002, an alignment film 1010 formed on a surface of the first transparent electrode 1006 that faces the second transparent electrode 1008, and an alignment film 1012 formed on a surface of the second transparent electrode 1008 that faces the first transparent electrode 1006. The first and second transparent electrodes 1006 and 1008 form planes extending in parallel to each other with a spacing therebetween.

The liquid crystal device is disposed on an optical path between a light source of an optical head that emits a light beam from the light source onto a recording surface of an optical disk to detect reflected light from the recording surface, and the recording surface.

FIG. 5A is a plan view of the first transparent electrode of the liquid crystal device of the second embodiment, FIG. 5B is a plan view of the second transparent electrode, FIG. 5C is a diagram showing that a liquid crystal is filled between the first and second transparent electrodes, and FIG. 5D is a cross-sectional view, taken along a line X-X of FIG. 5C.

As shown in FIG. 5A, the first transparent electrode 1006 of the liquid crystal device 20 has a first annular electrode portion 1006A, a second round electrode portion 1006B formed in the first electrode portion 1006A, and a third electrode portion 1006C formed around the first electrode portion 1006A.

As shown in FIG. 5B, the second transparent electrode 1008 has a fourth annular electrode portion 1008A, a fifth round electrode portion 1008B formed in the fourth electrode portion 1008A, and a sixth electrode portion 1008C formed around the fourth electrode portion 1008A.

The first and fourth electrode portions 1006A and 1008A have the same annular shape, and the second and fifth electrode portions 1006B and 1008B have the same round shape.

As shown in FIG. 5C, the outer diameter of each of the first and fourth electrode portions 1006A and 1008A is greater than the outer diameter of a beam spot B of the light beam that passes through the first and second transparent electrodes 1006 and 1008, and the outer diameter of each of the second and fifth electrode portions 1006B and 1008B is smaller than the outer diameter of the beam spot B of the light beam that passes through the first and second transparent electrodes 1006 and 1008.

As shown in FIG. 5C, the first and second transparent electrodes 1006 and 1008 are disposed so that there is a spacing between a first axis that extends through the center of the first electrode portion 1006A and that is orthogonal to the first transparent electrode 1006 and a second axis that extends through the center of the fourth electrode portion 1008A and that is orthogonal to the second transparent electrode 1008.

The light beam emitted from the optical head onto the recording surface and the axis orthogonal to the recording surface are included in a plane including the first axis and the second axis. Thus, when the recording surface of the optical disk is tilted (inclined) with respect to the light beam entering from the optical head, that is, when there is an angle between the axis orthogonal to the recording surface and the light beam, this angle is produced in this plane.

As shown in FIG. 5D, the first electrode portion 1006A faces the fourth, fifth, and sixth electrode portions 1008A, 1008B, and 1008C with the liquid crystal 1014 disposed therebetween.

The second electrode portion 1006B faces the fourth and fifth electrode portions 1008A and 1008B with the liquid crystal 1014 disposed therebetween.

The third electrode portion 1006C faces the fifth and sixth electrode portions 1008B and 1008C with the liquid crystal 1014 disposed therebetween.

The operation principle of the liquid crystal device 20 of this structure is similar to that described above in the first embodiment, and a description thereof is thus omitted.

The method and apparatus for driving the liquid crystal device according to the second embodiment of the present invention will now be described.

Figure 12:
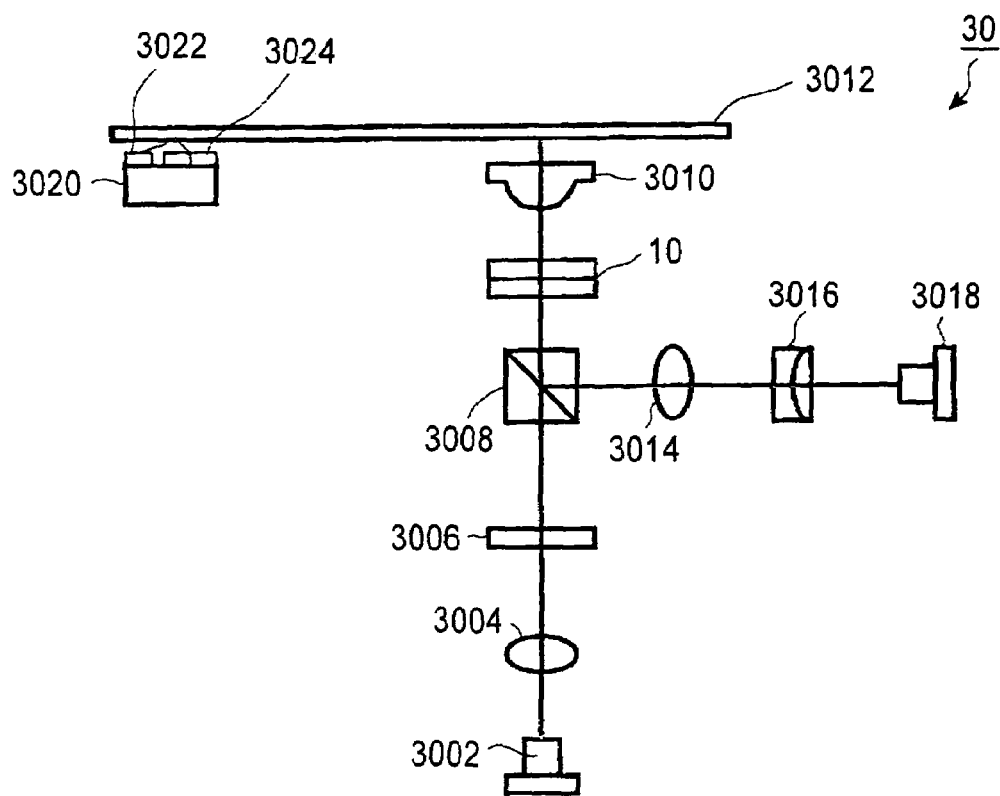
FIG. 12 is a configuration diagram of an optical system of an optical-medium recording and playback apparatus including the liquid crystal device of the second embodiment.

FIG. 12 is a configuration diagram of an optical system of an optical-medium recording and playback apparatus using the liquid crystal device of the second embodiment.

As shown in FIG. 12, an optical system 30 of the optical-recording-medium recording and playback apparatus is configured such that a light beam emitted from a laser light source 3002 passes through a collimating lens 3004, a grating 3006, and a beam splitter 3008 in the stated order and is then focused onto a recording layer of an optical disk 3012 by an objective lens 3010 via the liquid crystal device 10 of the present invention, and the reflected light beam reflected by the recording layer is split by the beam splitter 3008 via the liquid crystal device 10, passing through a condensing lens 3014 and a multi-lens 3016 in the stated order, and then reaches a photodetector 3018 so as to detect a light-receiving signal.

A tilt sensor 3020 is disposed so as to face one surface of the optical disk 3012 in its thickness direction.

Figure 13A:
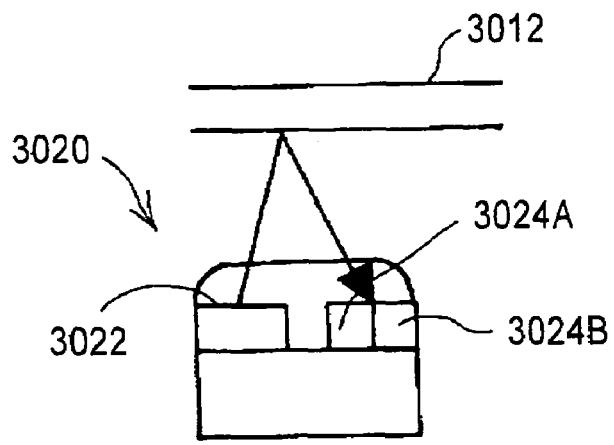
FIG. 13A is a diagram showing a tilt sensor as viewed from a side thereof.
Figure 13B:
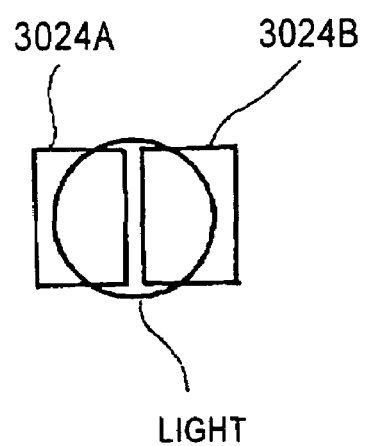
FIG. 13B is a diagram showing the tilt sensor as viewed from the sensor side.

As shown in FIGS. 13A and 13B, the tilt sensor 3020 includes an LED 3022 that irradiates light onto the surface of the optical disk 3012, and two adjacent sensors 3024A and 3024B that receive the light reflected by this surface and that output detection signals according to the amount of light. The amount of light received by the sensors 3024A and 3024B varies when the position of the received light changes in response to inclination, or tilting, of the optical disk 3012.

Figure 14:
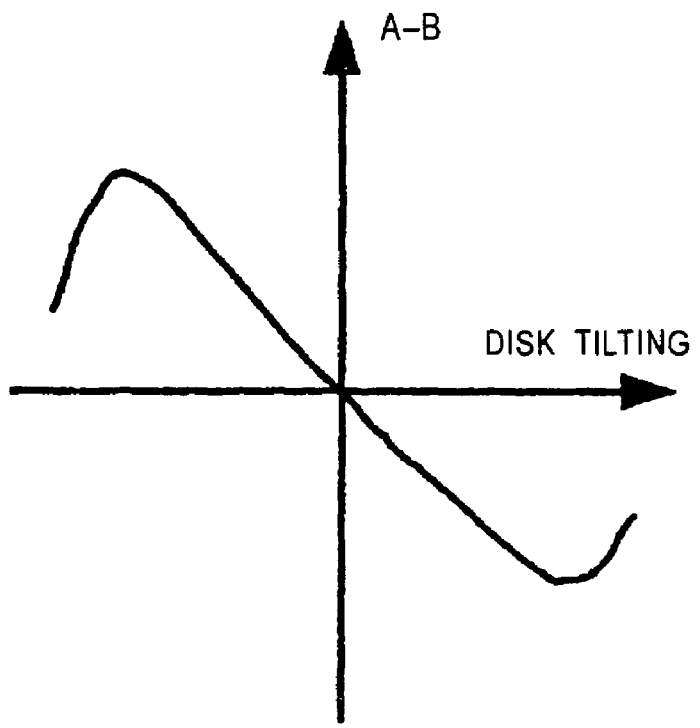
FIG. 14 is a characteristic chart showing a difference signal of detection signals output from the tilt sensor.

As shown in FIG. 14, the difference (A−B) between detection signals A and B of the two sensors 3024A and 3024B (on the y-axis) varies depending upon the tilt amount of the optical disk (on the x-axis).

Figure 15:
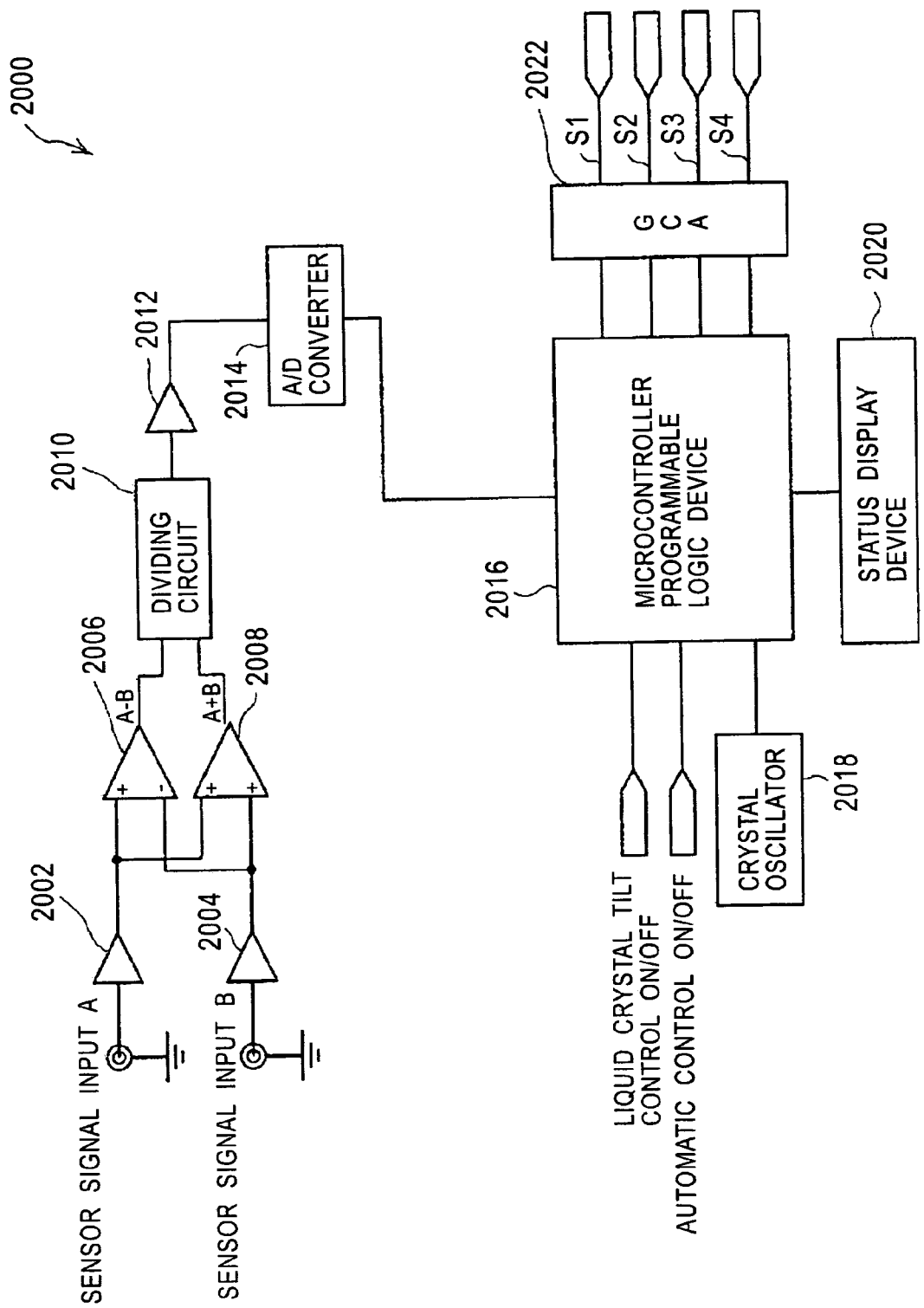
FIG. 15 is a circuit diagram showing a control system of an apparatus for driving the liquid crystal device according to the second embodiment.

FIG. 15 is a circuit diagram showing a control system of the apparatus for driving the liquid crystal device of the second embodiment.

As shown in FIG. 15, in a driving apparatus 2000, the detection signals A and B from the tilt sensor 3020 are amplified by buffer amplifiers 2002 and 2004, and a difference signal (A−B) and a sum signal (A+B) are generated from the signals by a differential amplifier 2006 and a summing amplifier 2008, respectively. The difference signal is divided by the sum signal by a dividing circuit 2010, and the division signal is amplified by a gain amplifier 2012. The amplified signal is converted by an A/D converter 2014 into a digital signal, and the digital signal is then input to a microcontroller programmable logic device 2016 as tilt data indicating the tilt direction and tilt amount of the disk.

The microcontroller programmable logic device 2016 operates based on an oscillation signal input from a crystal oscillator 2018, and the status of the microcontroller programmable logic device 2016 is displayed on a status display device 2020.

The microcontroller programmable logic device 2016 controls the phase differences between driving signals S1 to S4 applied to the first to sixth electrode portions of the liquid crystal device 20 according to the tilt data input from the A/D converter 2014. The driving signals S1 to S4 are amplified by a gain control amplifier (GCA) 2022, and are then applied to the first to sixth electrode portions.

In the second embodiment, the microcontroller programmable logic device 2016 constitutes the control means set forth in CLAIMS, and the gain control amplifier 2022 constitutes the voltage application means set forth in CLAIMS.

Figure 6:
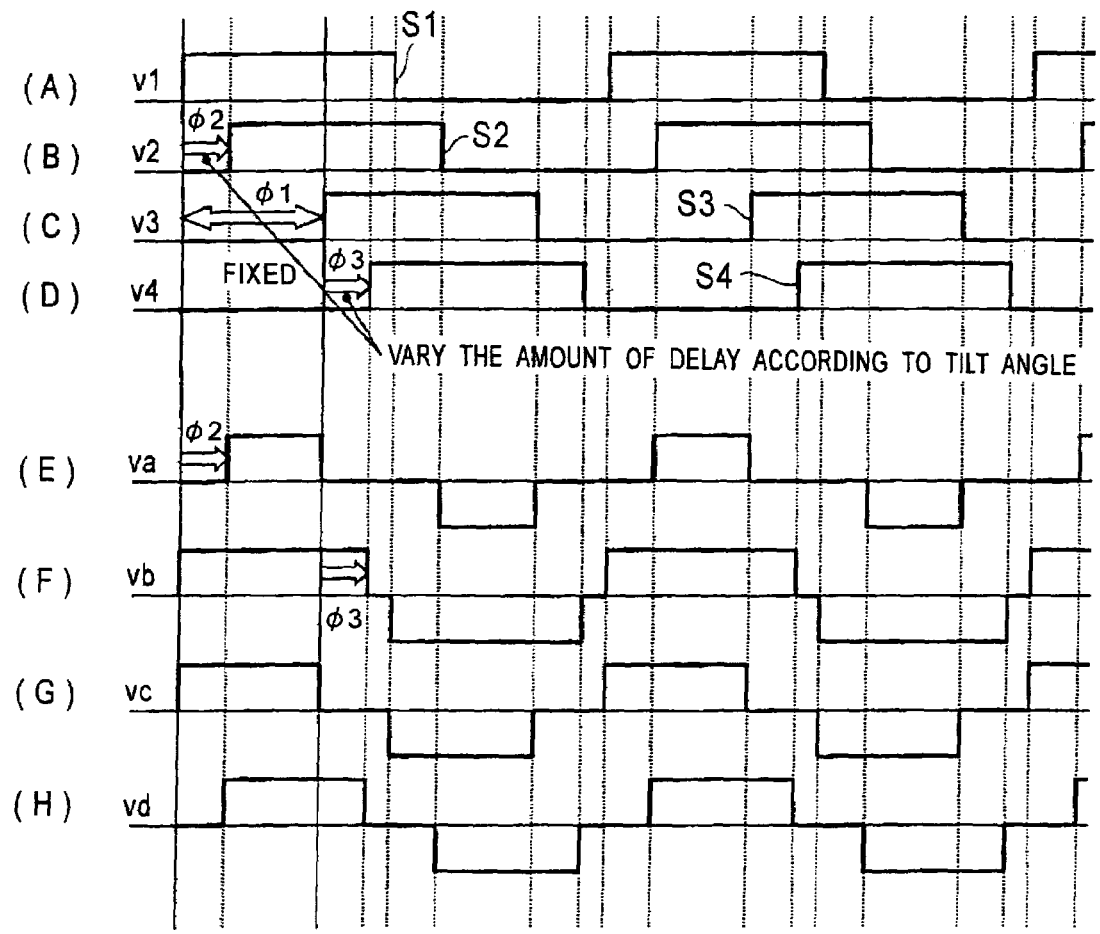
FIG. 6 is a waveform diagram showing driving signals for driving the liquid crystal device, and effective voltages applied to portions of the liquid crystal.

FIG. 6 is a waveform diagram showing driving signals for driving the liquid crystal device, and effective voltages applied to the portions of the liquid crystal.

As shown in (D) of FIG. 6, the driving apparatus 2000 applies a first driving signal S1 having a square-wave voltage V1 to the first electrode portion 1006A. The driving apparatus 2000 further applies a second driving signal S2 having a square-wave voltage V2 to the second and third electrode portions 1006B and 1006C. The driving apparatus 2000 further applies a third driving signal S3 having a square-wave voltage V3 to the fourth electrode portion 1008A. The driving apparatus 2000 further applies a fourth driving signal S4 having a square-wave voltage V4 to the fifth and sixth electrode portions 1008B and 1008C.

As shown in FIG. 6, the first driving signal S1 and the third driving signal S3 are applied to a liquid crystal portion (a first liquid crystal portion) of the liquid crystal 1014 disposed between the first electrode portion 1006A and the fourth electrode portion 1008A, thus applying a voltage of Vd=V1−V3 to the first liquid crystal portion.

The first driving signal S1 and the fourth driving signal S4 are applied to a liquid crystal portion (a second liquid crystal portion) of the liquid crystal 1014 disposed between the first electrode portion 1006A and the fifth and sixth electrode portions 1008B and 1008C, thus applying causing a voltage of Va=V1−V4 to the second liquid crystal portion.

The second driving signal S2 and the third driving signal S3 are applied to a liquid crystal portion (a third liquid crystal portion) of the liquid crystal 1014 disposed between the second electrode portion 1006B and the fourth electrode portion 1008A, thus applying a voltage of Vb=V2−V3 to the third liquid crystal portion.

The second driving signal S2 and the fourth driving signal are applied to a liquid crystal portion (a fourth liquid crystal portion) of the liquid crystal 1014 disposed between the second electrode portion 1006B and the fifth electrode portion 1008B, thus applying a voltage of Vc=V2−V4 to the fourth liquid crystal portion.

The second driving signal S2 and the third driving signal S3 are also applied to a liquid crystal portion (the third liquid crystal portion) of the liquid crystal 1014 disposed between the third electrode portion 1006C and the fourth electrode portion 1008A, thus applying a voltage of Vb=V2−V3 to the third liquid crystal portion.

The second driving signal S2 and the fourth driving signal are also applied to a liquid crystal portion (the fourth liquid crystal portion) of the liquid crystal 1014 disposed between the third electrode portion 1006C and the sixth electrode portion 1008C, thus applying a voltage of Vc=V2−V4 to the fourth liquid crystal portion.

The effective values of Vc and Vd are the same.

Thus, the voltages are independently applied to the first to fourth liquid crystal portions of the liquid crystal 1014 disposed between the first transparent electrode 1006 and the second transparent electrode 1008.

As shown in FIG. 6, the phase difference between the first driving signal S1 and the third driving signal S3 is represented by φ1, the phase difference between the first driving signal S1 and the second driving signal S2 is represented by φ2, and the phase difference between the third driving signal S3 and the fourth driving signal S4 is represented by φ3.

It is assumed that the first to fourth driving signals S1 through S4 have the same voltage amplitude, frequency, and duty ratio.

The phase difference φ1 is fixed irrespective of whether or not the optical disk is tilted, and the phase difference φ2 and the phase difference φ3 are adjusted by a time lead or lag by an identical phase amount according to the tilt angle (also referred to as a skew angle), i.e., according to the amount of spherical aberration.

Thus, the relationship of effective values Vae to Vde of the voltages Va to Vd is any one of the following two types:

$$Vae < Vce = Vde < Vbe \quad (A)$$

$$Vbe < Vce = Vde < Vae \quad (B)$$

where Vce is always equal to Vde.

One of the second liquid crystal portion with the voltage Va applied thereto and the third liquid crystal portion with the voltage Vb applied thereto has a phase lead relative to both the fourth liquid crystal portion with the voltage Vc applied thereto and the first liquid crystal portion with the voltage Vd applied thereto, and the other of the second liquid crystal portion with the voltage Va applied thereto and the third liquid crystal portion with the voltage Vb applied thereto has a phase lag relative to both the fourth liquid crystal portion with the voltage Vc applied thereto and the first liquid crystal portion with the voltage Vd applied thereto.

Thus, the driving apparatus 2000 adjusts the phase differences φ2 and φ3 according to the tilt data indicating the tilt direction and tilt angle of the optical disk, thereby applying the opposite-phase distribution for canceling the aberration in the phase distribution, which is caused by the tilting, in advance to the light beam entering the transparent disk substrate. This allows for compensation of the phase aberration caused by the tilting of the optical disk.

Also in this embodiment, like the first embodiment, it is preferable that the amplitude of the voltages V1 to V4 of the first to fourth driving signals S1 to S4 be adjusted so that the refractive index of the liquid crystal 1014 changes substantially linearly with respect to the change of the phase differences φ2 and φ3.

As described above, according to this embodiment, the liquid crystal device 20 is disposed between a light source of an optical head and a recording surface of an optical disk, and is driven by the driving method described above, thus compensating for the spatial phase shift in a playback laser beam spot caused by tilting of the optical disk. This also prevents degradation in quality of the playback signals and the occurrence of read errors.

A description will now be made of the advantages of the liquid crystal device of the second embodiment over the liquid crystal device of the related art.

In a liquid crystal device 20A of the related art, as shown in FIGS. 9A and 9B, a first transparent electrode 1006 includes seven electrode portions A1, A2, B2, B3, C1, C2, and C3. A second transparent electrode 1008 is a single electrode.

A reference potential is applied to the second transparent electrode 1008, and square-wave voltages shown in FIG. 10 are applied to the electrode portions A1, A2, B2, B3, C1, C2, and C3 of the first transparent electrode 1006.

Specifically, a voltage of amplitude Va is applied to the electrode portions A1 and A2, a voltage of amplitude Vb is applied to the electrode portions B1 and B2, and a voltage of amplitude Vc is applied to the electrode portions C1, C2, and C3.

The relationship of the voltage amplitudes Va, Vb, and Vc is as follows:

The relationship of Va−Vc=Vc−Vb is maintained.

As the tilt amount of an optical disk increases in a given direction, Va increases with respect to Vc, and Vb decreases with respect to Vc. When the optical disk is tiled in the opposite direction, as the tilt amount increases, Va decreases with respect to Vc and Vb increases with respect to Vc.

In such a liquid crystal device of the related art, the voltages are adjusted according to the tilt direction and tilt angle of the optical disk to selectively adjust the refractive indexes of the liquid crystal portions to which the voltages Va, Vb, and Vc are applied, thereby compensating for the aberration in the phase distribution caused by tilting of the optical disk.

However, as described above, such a liquid crystal device of the related art requires a complex circuit structure for generating a square wave whose reference potential is the ground level, thus increasing the cost. In contrast with such a drawback of the related art, the second embodiment is advantageous in that a driving circuit for driving the liquid crystal device 20 can be simple, thus reducing the cost.

A third embodiment will now be described.

The third embodiment is different from the second embodiment in that driving signals are controlled so that the envelope (amplitude) of an RF signal obtained by playback of a recording signal recorded in an optical disk becomes the maximum. That is, the envelope (amplitude) of the RF signal is maximum, resulting in no tilt error.

Figure 16:
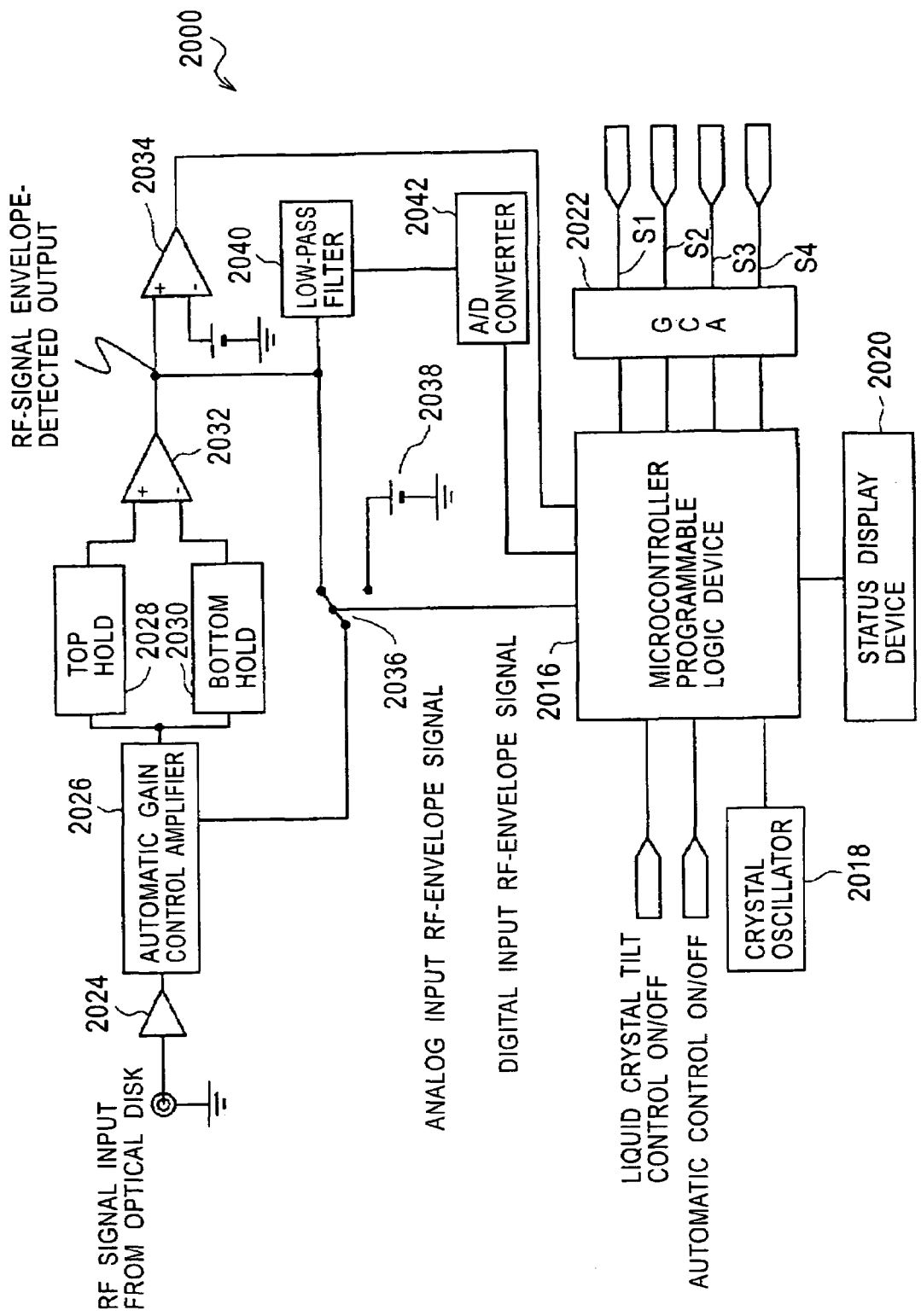
FIG. 16 is a circuit diagram showing a control system of an apparatus for driving a liquid crystal device according to a third embodiment.

FIG. 16 is a circuit diagram showing a control system of a driving apparatus for a liquid crystal device according to the third embodiment. Components similar to those of the second embodiment shown in FIG. 15 are given the same reference numerals, and a description thereof is omitted.

As shown in FIG. 16, in a driving apparatus 2000, an RF signal detected by the photodetector 3018 described above is amplified by a buffer amplifier 2024 and an automatic gain control amplifier 2026.

The gain of the automatic gain control amplifier 2026 is automatically switched by a gain switch 2036 to a fixed gain in response to application of an RF-fixed-gain voltage source 2038, and to an automatic gain in response to application of an RF-signal envelope-detected output that is an output of a differential amplifier 2032 described below. The gain switch 2036 is controlled by the microcontroller programmable logic device 2016.

The top value and bottom value of the output of the automatic gain control amplifier 2026 are detected by a top-hold circuit 2028 and a bottom-hold circuit 2030, respectively. The differential amplifier 2032 inputs the difference signal between the top value and the bottom value to a comparator 2034 and a low-pass filter 2040 as an RF-signal envelope-detected signal.

The envelope-detected signal input to the low-pass filter 2040 is then converted by an A/D converter 2042 into a digital signal, and the digital signal is then input to the microcontroller programmable logic device 2016.

When the level of the input envelope-detected signal is greater than a reference, the comparator 2034 inputs a signal indicating this to the microcontroller programmable logic device 2016.

The microcontroller programmable logic device 2016 controls the driving signals S1 to S4 based on the digital signal input from the A/D converter 2042 and the signal input from the comparator 2034 so that the envelope (amplitude) of the RF signal becomes the maximum.

As is appreciated, this structure also achieves advantages similar to those of the second embodiment described above.

A fourth embodiment will now be described.

The fourth embodiment is different from the second embodiment in that driving signals are controlled so that, when a tracking error signal is detected by the DPP (Differential Push-Pull) method and a focus error signal is detected by the DPD (Differential Phase Detection) method, the difference between the DPP signal and the DPD signal becomes zero. That is, the difference between the DPP signal and the DPD signal is zero, resulting in no tilt error.

Figure 17:
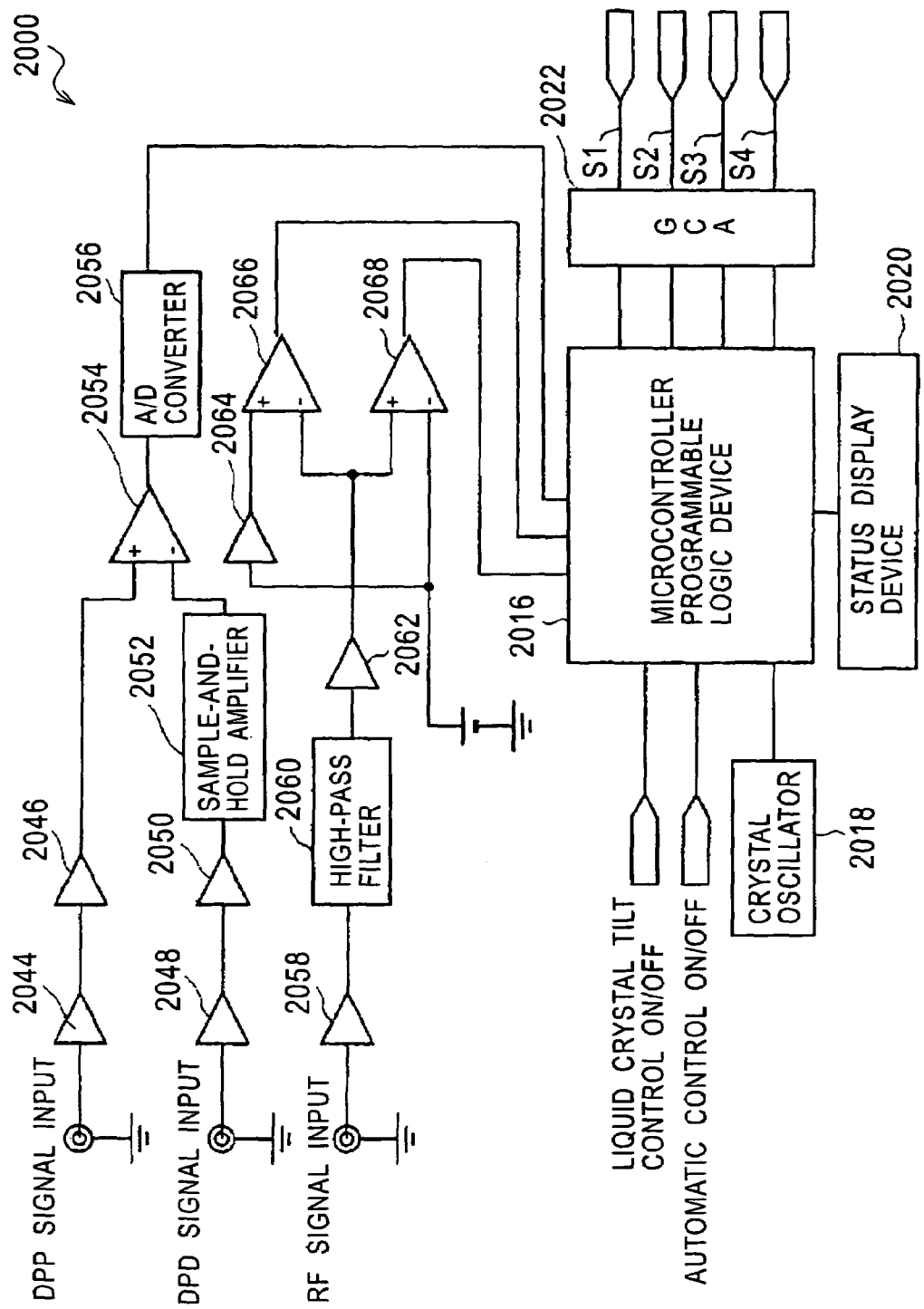
FIG. 17 is a circuit diagram showing a control system of an apparatus for driving a liquid crystal device according to a fourth embodiment.

FIG. 17 is a circuit diagram showing a control system of a driving apparatus for a liquid crystal device according to the fourth embodiment. Components similar to those of the second embodiment shown in FIG. 15 are given the same reference numerals, and a description thereof is omitted.

As shown in FIG. 17, in a driving apparatus 2000, a DPP signal is amplified by a buffer amplifier 2044 and a gain amplifier 2046, and is then input to a differential amplifier 2054. A DPD signal is amplified by a buffer amplifier 2048 and a gain amplifier 2050, and is then input to a sample-and-hold amplifier 2052 for sampling and holding. The result is input to the differential amplifier 2054. The differential amplifier 2054 inputs a signal corresponding to the difference between the DPP signal and the DPD signal to an A/D converter 2056. The difference signal, which has been converted into digital data, is then input to the microcontroller programmable logic device 2016.

The RF signal detected by the photodetector 3018 is amplified by a buffer amplifier 2058, and is then input to a gain amplifier 2062 via a high-pass filter 2060. The amplified signal is then input to a comparator circuit.

The comparator circuit includes a −1x amplifier 2064, and comparators 2066 and 2068. The output of the gain amplifier 2062 is input to the inverting input terminal of the comparator 2066 and the non-inverting input terminal of the comparator 2068. A reference voltage in which the reference voltage is magnified by a factor of −1 by the −1x amplifier 2064 is input to the non-inverting input terminal of the comparator 2066, and the reference voltage is input to the inverting input terminal of the comparator 2068.

Each of the comparators 2066 and 2068 inputs a digital signal corresponding to the RF signal input from the gain amplifier 2062 to the microcontroller programmable logic device 2016.

The microcontroller programmable logic device 2016 controls the driving signals S1 to S4 so that the difference between the DPP signal and the DPD signal becomes zero based on the digital signal input from the A/D converter 2056 and the signals input from the comparators 2066 and 2068.

As is appreciated, this structure also achieves advantages similar to those of the second embodiment described above.

INDUSTRIAL APPLICABILITY

As described above, according to a liquid crystal device of the present invention, and a method and an apparatus for driving the same, the refractive index of the liquid crystal device is adjusted using a simple driving method and apparatus, and it is advantageous in that the cost is reduced.

The invention claimed is:

1. A method for driving a liquid crystal device including a first transparent substrate and a second transparent substrate that face each other, a liquid crystal filled between the first and second transparent substrates, a first transparent electrode formed on a surface of the first transparent substrate that faces the second transparent substrate, and a second transparent electrode formed on a surface of the second transparent substrate that faces the first transparent substrate, the method comprising the steps of:

applying a first driving signal of a square-wave voltage to the first transparent electrode and applying a second driving signal of a square-wave voltage to the second transparent electrode;

where the first driving signal has a voltage amplitude V1, a frequency F1, and a duty ratio D1, the second driving signal has a voltage amplitude V2, a frequency F2, and a duty ratio D2, and a phase difference between the first driving signal and the second driving signal is indicated by $\phi$, adjusting V1 and V2 so that a refractive index $\Delta N$ of the liquid crystal changes in a substantially linear range relative to $\phi$; and controlling the refractive index $\Delta N$ of the liquid crystal by adjusting the phase difference $\phi$ in a state where V1=V2, F1=F2, and D1=D2 so as to vary an effective voltage to be applied to the liquid crystal.

2. A method for driving a liquid crystal device according to claim 1, wherein the liquid crystal device is disposed on an optical path between a light source of an optical head and a recording surface of an optical disk, the optical head emitting a light beam from the light source onto a land and a groove that are formed on and in the recording surface and detecting reflected light from the land and the groove; and the refractive index of the liquid crystal of the liquid crystal device is controlled to compensate for an optical phase difference generated between the reflected light from the land and the reflected light from the groove.

3. An apparatus for driving a liquid crystal device including a first transparent substrate and a second transparent substrate that face each other, a liquid crystal filled between the first and second transparent substrates, a first transparent electrode formed on a surface of the first transparent substrate that faces the second transparent substrate, and a second transparent electrode formed on a surface of the second transparent substrate that faces the first transparent substrate, the apparatus comprising:

voltage application means for applying a first driving signal of a square-wave voltage to the first transparent electrode and applying a second driving signal of a square-wave voltage to the second transparent electrode; and control means for, where the first driving signal has a voltage amplitude V1, a frequency F1, and a duty ratio D1, the second driving signal has a voltage amplitude V2, a frequency F2, and a duty ratio D2, and a phase difference between the first driving signal and the second driving signal is indicated by $\phi$, adjusting V1 and V2 so that a refractive index $\Delta N$ of the liquid crystal changes substantially linearly relative to $\phi$ and controlling the refractive index $\Delta N$ of the liquid crystal by adjusting the phase difference $\phi$ in a state where V1=V2, F1=F2, and D1=D2 so as to vary an effective voltage to be applied to the liquid crystal.

4. An apparatus for driving a liquid crystal device according to claim 3, wherein the liquid crystal device is disposed between a light source of an optical head and a recording surface of an optical disk, the optical head emitting a light beam from the light source onto a land and a groove that are formed on and in the recording surface and detecting reflected light from the land and the groove; and the refractive index of the liquid crystal of the liquid crystal device is adjusted to compensate for an optical phase difference generated between the reflected light from the land and the reflected light from the groove.

5. A liquid crystal device comprising a first transparent substrate and a second transparent substrate that face each other, a liquid crystal filled between the first and second transparent substrates, a first transparent electrode formed on a surface of the first transparent substrate that faces the second transparent substrate, and a second transparent electrode formed on a surface of the second transparent substrate that faces the first transparent substrate, the first and second transparent electrodes forming planes that extend in parallel to each other with a spacing therebetween, wherein the first transparent electrode includes a first annular electrode portion, a second round electrode portion formed in the first electrode portion, and a third electrode portion formed around the first electrode portion;

the second transparent electrode includes a fourth annular electrode portion, a fifth round electrode portion formed in the fourth electrode portion, and a sixth electrode portion formed around the fourth electrode portion;

the first and fourth electrode portions have the same annular shape, and the second and fifth electrode portions have the same round shape; and the first and second transparent electrodes are disposed so that there is a spacing between a first axis and a second axis, the first axis extending through the center of the first electrode portion and being orthogonal to the first transparent electrode, the second axis extending through the center of the fourth electrode portion and being orthogonal to the second transparent electrode.

6. A liquid crystal device according to claim 5, wherein the first electrode portion faces the fourth, fifth, and sixth electrode portions with the liquid crystal disposed therebetween; the second electrode portion faces the fourth and fifth electrode portions with the liquid crystal disposed therebetween; and the third electrode portion faces the fifth and sixth electrode portions with the liquid crystal disposed therebetween.

7. A liquid crystal device according to claim 5, wherein the liquid crystal device is disposed on an optical path between a light source of an optical head and a recording surface of an optical disk, the optical head emitting a light beam from the light source onto the recording surface and detecting reflected light from the recording surface; and a refractive index of the liquid crystal of the liquid crystal device is adjusted to compensate for a spatial optical phase difference of the reflected light generated on the optical disk due to an angle, or a tilt, between the light beam emitted from the optical head onto the recording surface and an axis orthogonal to the recording surface.

8. A liquid crystal device according to claim 7, wherein the light beam emitted from the optical head onto the recording surface and the axis orthogonal to the recording surface are included in a plane including the first axis and the second axis.

9. A liquid crystal device according to claim 7, wherein an outer diameter of each of the first and fourth electrode portions is greater than an outer diameter of a beam spot of a light beam that passes through the first and second transparent electrodes, and an outer diameter of each of the second and fifth electrode portions is smaller than the outer diameter of the beam spot of the light beam that passes through the first and second transparent electrodes.

10. A method for driving a liquid crystal device including a first transparent substrate and a second transparent substrate that face each other, a liquid crystal filled between the first and second transparent substrates, a first transparent electrode formed on a surface of the first transparent substrate that faces the second transparent substrate, and a second transparent electrode formed on a surface of the second transparent substrate that faces the first transparent substrate, the first and second transparent electrodes forming planes that extend in parallel to each other with a spacing therebetween, the first transparent electrode having a first annular electrode portion, a second round electrode portion formed in the first electrode portion, and a third electrode portion formed around the first electrode portion, the second transparent electrode having a fourth annular electrode portion, a fifth round electrode portion formed in the fourth electrode portion, and a sixth electrode portion formed around the fourth electrode portion, the first and fourth electrode portions having the same annular shape, the second and fifth electrode portions having the same round shape, the method comprising the steps of:

applying a first driving signal of a square-wave voltage to the first electrode portion;

applying a second driving signal of a square-wave voltage to the second and third electrode portions;

applying a third driving signal of a square-wave voltage to the fourth electrode portion;

applying a fourth driving signal of a square-wave voltage to the fifth and sixth electrode portions; and where a phase difference between the first driving signal and the third driving signal is indicated by $\phi1$, a phase difference between the first driving signal and the second driving signal is indicated by $\phi2$, and a phase difference between the third driving signal and the fourth driving signal is indicated by $\phi3$, controlling a refractive index of the liquid crystal disposed between the first transparent electrode and the second transparent electrode by fixing the phase difference $\phi1$ and adjusting the phase difference $\phi2$ and the phase difference $\phi3$ by an identical phase amount in a state where the first to fourth driving signals have the same voltage amplitude, frequency, and duty ratio, so as to vary an effective voltage to be applied to the liquid crystal.

11. A method for driving a liquid crystal device according to claim 10, wherein the liquid crystal disposed between the first transparent electrode and the second transparent electrode has a first liquid crystal portion to which the first driving signal and the third driving signal are applied, a second liquid crystal portion to which the first driving signal and the fourth driving signal are applied, a third liquid crystal portion to which the second driving signal and the third driving signal are applied, and a fourth liquid crystal portion to which the second driving signal and the fourth driving signal are applied; and the refractive index of the liquid crystal disposed between the first transparent electrode and the second transparent electrode is controlled independently for the first to fourth liquid crystal portions.

12. A method for driving a liquid crystal device according to claim 10, wherein the voltage amplitudes of the first to fourth driving signals are adjusted so that the refractive index of the liquid crystal substantially linear changes relative to a change of the phase differences $\phi2$ and $\phi3$.

13. An apparatus for driving a liquid crystal device including a first transparent substrate and a second transparent substrate that face each other, a liquid crystal filled between the first and second transparent substrates, a first transparent electrode formed on a surface of the first transparent substrate that faces the second transparent substrate, and a second transparent electrode formed on a surface of the second transparent substrate that faces the first transparent substrate, the first and second transparent electrodes forming planes that extend in parallel to each other with a spacing therebetween, the first transparent electrode having a first annular electrode portion, a second round electrode portion formed in the first electrode portion, and a third electrode portion formed around the first electrode portion, the second transparent electrode having a fourth annular electrode portion, a fifth round electrode portion formed in the fourth electrode portion, and a sixth electrode portion formed around the fourth electrode portion, the first and fourth electrode portions having the same annular shape, the second and fifth electrode portions having the same round shape, the apparatus comprising:

voltage application means for applying a first driving signal of a square-wave voltage to the first electrode portion, applying a second driving signal of a square-wave voltage to the second and third electrode portions, applying a third driving signal of a square-wave voltage to the fourth electrode portion, and applying a fourth driving signal of a square-wave voltage to the fifth and sixth electrode portions; and control means for, where a phase difference between the first driving signal and the third driving signal is indicated by $\phi1$, a phase difference between the first driving signal and the second driving signal is indicated by $\phi2$, and a phase difference between the third driving signal and the fourth driving signal is indicated by $\phi3$, controlling a refractive index of the liquid crystal disposed between the first transparent electrode and the second transparent electrode by fixing the phase difference $\phi1$ and adjusting the phase difference $\phi2$ and the phase difference $\phi3$ by an identical phase amount in a state where the first to fourth driving signals have the same voltage amplitude, frequency, and duty ratio, so as to vary an effective voltage to be applied to the liquid crystal.

14. An apparatus for apparatus a liquid crystal device according to claim 13, wherein the liquid crystal disposed between the first transparent electrode and the second transparent electrode has a first liquid crystal portion to which the first driving signal and the third driving signal are applied, a second liquid crystal portion to which the first driving signal and the fourth driving signal are applied, a third liquid crystal portion to which the second driving signal and the third driving signal are applied, and a fourth liquid crystal portion to which the second driving signal and the fourth driving signal are applied; and the control means independently controls the refractive index of the liquid crystal disposed between the first transparent electrode and the second transparent electrode for the first to fourth liquid crystal portions.

15. An apparatus for driving a liquid crystal device according to claim 13, wherein the voltage amplitudes of the first to fourth driving signals are adjusted so that the refractive index of the liquid crystal substantially linear changes relative to a change of the phase differences $\phi2$ and $\phi3$.

* * * * *

UNITED STATES PATENT AND TRADEMARK OFFICE
CERTIFICATE OF CORRECTION

PATENT NO. : 7,355,952 B2  Page 1 of 1
APPLICATION NO. : 10/505167
DATED : April 8, 2008
INVENTOR(S) : Yasuyuki Takeshita et al.

It is certified that error appears in the above-identified patent and that said Letters Patent is hereby corrected as shown below:

Column 9, line 16, delete ", and the recording surface"

Column 18, line 43, delete "apparatus" second occurrence

Signed and Sealed this

Twenty-fifth Day of November, 2008

JON W. DUDAS
*Director of the United States Patent and Trademark Office*